(12) United States Patent
Zamrzla

(10) Patent No.: US 8,991,108 B1
(45) Date of Patent: Mar. 31, 2015

(54) AUTOMATIC ANCHOR FOR A SELF-PROPELLED IRRIGATION SYSTEM

(71) Applicant: Scott Richard Zamrzla, Kearney, NE (US)

(72) Inventor: Scott Richard Zamrzla, Kearney, NE (US)

( * ) Notice: Subject to any disclaimer, the term of this patent is extended or adjusted under 35 U.S.C. 154(b) by 0 days.

(21) Appl. No.: 14/518,298

(22) Filed: Oct. 20, 2014

(51) Int. Cl.
*E02D 5/74* (2006.01)
*B60T 1/14* (2006.01)
*A01G 25/09* (2006.01)
*B60T 7/12* (2006.01)

(52) U.S. Cl.
CPC . *B60T 1/14* (2013.01); *A01G 25/09* (2013.01); *A01G 25/092* (2013.01); *B60T 7/12* (2013.01)
USPC .................................. 52/157; 188/7; 239/723

(58) Field of Classification Search
USPC .............................. 188/5–7; 239/723; 52/157
See application file for complete search history.

(56) References Cited

U.S. PATENT DOCUMENTS

| | | | | |
|---|---|---|---|---|
| 4,702,047 A | * | 10/1987 | Stokes | 52/156 |
| 7,438,243 B1 | * | 10/2008 | Erickson | 239/735 |
| 2011/0315197 A1 | * | 12/2011 | Angoli et al. | 136/246 |
| 2014/0286712 A1 | * | 9/2014 | Lutenegger et al. | 405/252.1 |
| 2014/0360107 A1 | * | 12/2014 | Bainter | 52/157 |

* cited by examiner

*Primary Examiner* — Christopher Schwartz

(57) ABSTRACT

An automated system which anchors the moving unit(s) of a self propelled irrigation machine to the ground in order to prevent said unit(s) from tipping over under extreme weather conditions. The automatic anchor for a self-propelled irrigation system includes a tubular body, a driving mechanism, a mounting mechanism, a shaft, a screwpile, and a control unit. The screwpile is sleeved by the tubular body and mounted onto the main frame of the moving unit(s) via the mounting mechanism. The medium shaft is telescopically connected to the screwpile on one end and operatively coupled to the driving mechanism at the other end. The control unit is communicably coupled to the driving mechanism and thus controls the rotation, position, and state of the screwpile. In the extended state, the screwpile anchors the moving unit to the ground and in the withdrawn state the screwpile is retracted thus allowing for standard operations.

18 Claims, 8 Drawing Sheets

Section C-C

Section D - D

AUTOMATIC ANCHOR FOR A SELF-PROPELLED IRRIGATION SYSTEM

FIELD OF THE INVENTION

The present invention relates generally to mobile irrigation systems. More specifically, the present invention is an automatic anchor that is incorporated into the moving unit(s) of a mobile irrigation system to prevent overturning under extreme environmental conditions such as high winds.

BACKGROUND OF THE INVENTION

Irrigation is the process of adding water to soil and plants in order to stimulate growth in the absence of natural resources i.e. rain. Irrigation has been around as long as humans have been cultivating and harvesting plants. One of the more prominent and the oldest means for irrigation is simply pouring water over the plants using a bucket or a similar device, an extremely labor intensive solution. This approach was prominent in ancient civilizations and is still seen in some less developed regions of the world. A more efficient and popular approach is called furrow irrigation. Furrow irrigation, also known as flood irrigation, pumps water to the crop fields where it is allowed to flow along the ground through crevices/trenches and in result among the crops. Flood irrigation is simple and cheap, but is highly inefficient; about half of the water is wasted and does not reach the crops. Water is lost due to runoff, evaporation, and transpiration. Various methods and solutions have been invented to decrease the water loss during these processes including capturing and reusing runoff and leveling the fields such that runoff does not occur in the first place, but this is limited to a certain extent.

The most efficient system for irrigation is the center-pivot irrigation system. Also known as circle irrigation or water wheel, the system utilizes a plurality of sprinklers distributed about a moving pipe segment to distribute water among a large region of crops. The standard system comprises a multitude of sequential piping equipped with spray nozzles, mounted on wheeled towers that translate about a central pivot point; the central pivot point feeds water to the piping. Because this method is not susceptible to evaporation and runoff, it is both efficient and highly popular in modern agriculture. The use of large machinery has its disadvantages, however. One prominent disadvantage is overturning under extreme weather conditions, more specifically strong winds. The design of the wheeled towers allow for the system to cover various elevation changes but leave the towers susceptible to turnovers. Turnovers lead to expensive damages, which in turn yields downtime.

The present invention provides a solution to this problem. This invention is an automatic anchoring system for the wheeled towers of an irrigation system. Equipped with a plurality of anchors, distributed about the wheeled towers. Thus, the possibility of an overturn due to environmental conditions, decreases substantially.

DETAILED DESCRIPTIONS OF THE INVENTION

All illustrations of the drawings are for the purpose of describing selected versions of the present invention and are not intended to limit the scope of the present invention.

Figure 6:
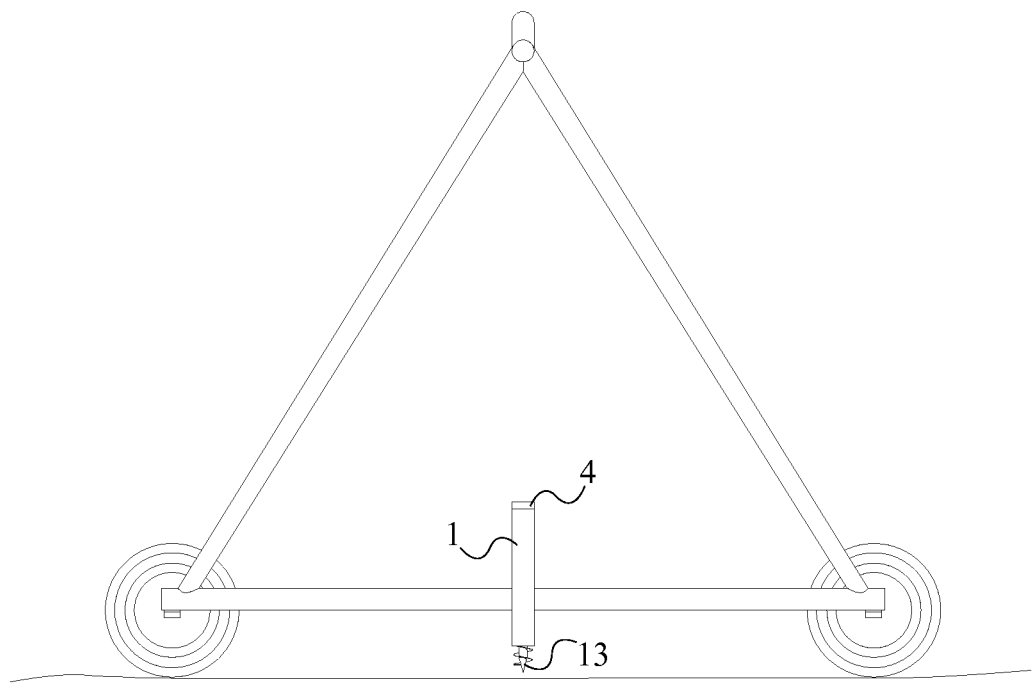
FIG. 6 is a front view of the present invention mounted onto an irrigation unit in the contracted state.
Figure 7:
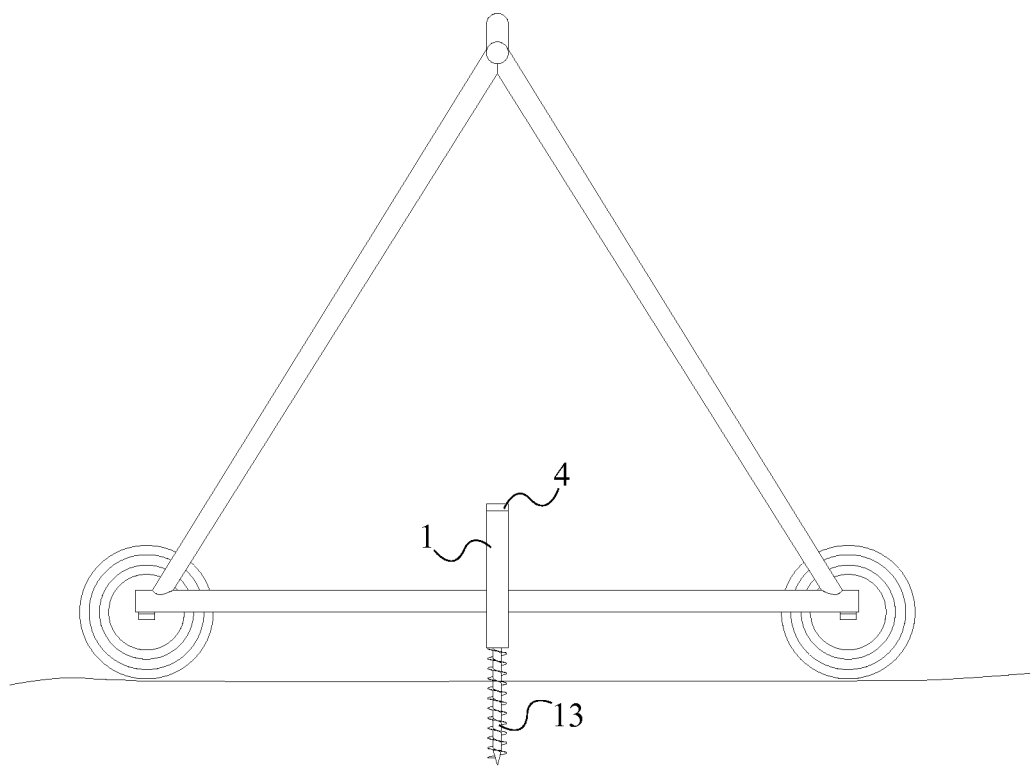
FIG. 7 is a front view of the present invention mounted onto an irrigation unit in the extended state.
Figure 8:
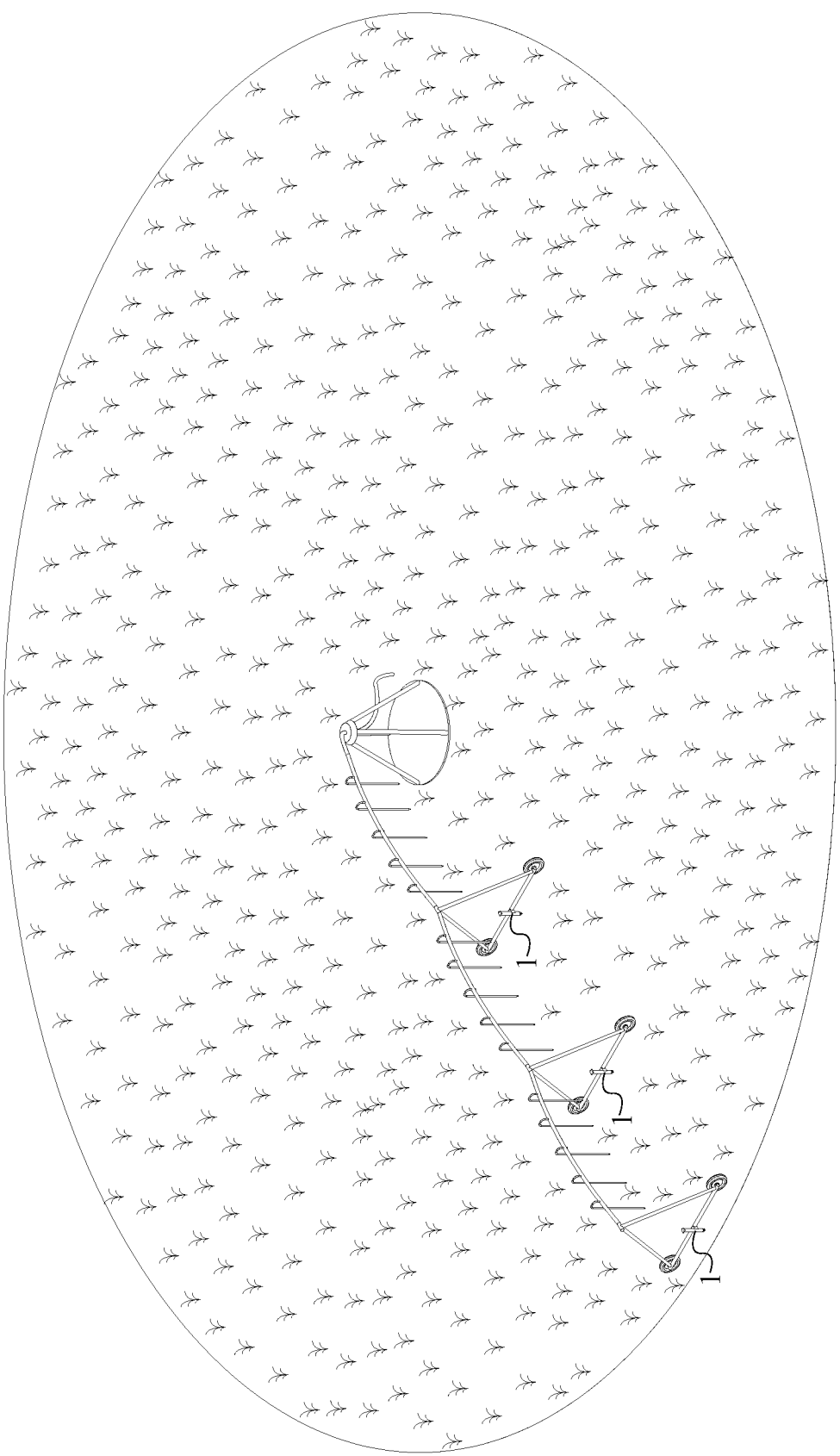
FIG. 8 is a perspective view of the present invention installed onto a plurality of irrigation units.

The present invention is an automatic anchoring system for crop irrigation equipment, in particular for mobile irrigation systems; the present invention prevents units of the mobile irrigation system from overturning under stressful environments such as high speed winds and extreme storms. The anchoring system may be installed onto irrigation unit(s) as a retrofit kit or may be incorporated into the design of the irrigation units as seen in FIG. 6-FIG. 8. In addition to irrigation equipment, the automatic anchoring system may also be altered and adapted to be used in various alternative fields and applications where a vehicle, machine, or equipment of any nature needs to be anchored to the ground. One particular example includes fitting the system with a hitch compatible feature and utilizing the system to anchor automotive vehicles to the ground.

Figure 1:
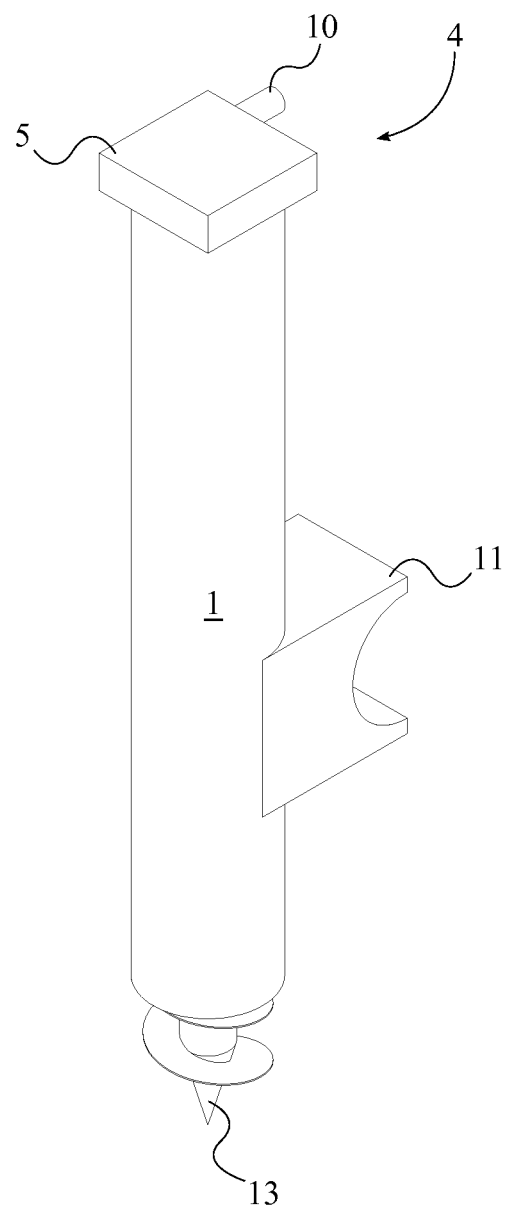
FIG. 1 is perspective view of the present invention.
Figure 2:
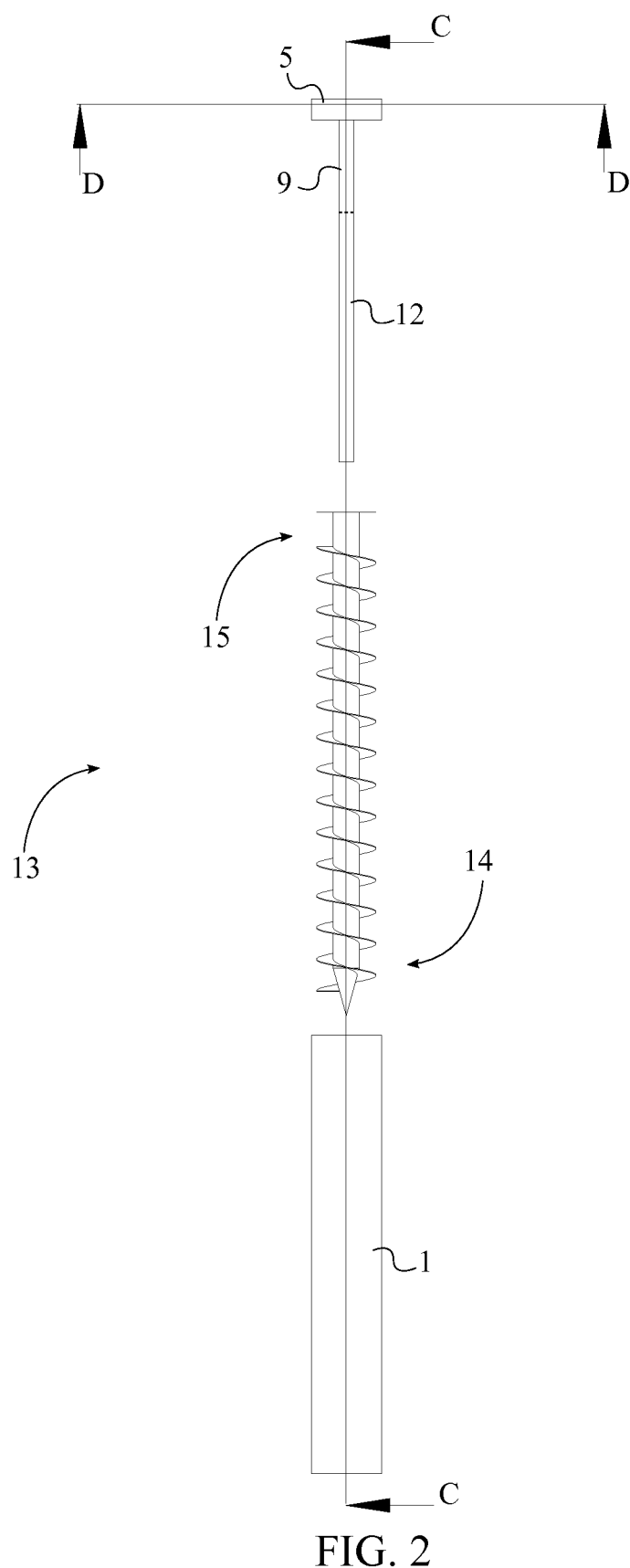
FIG. 2 is a front exploded view of the present invention.
Figure 3:
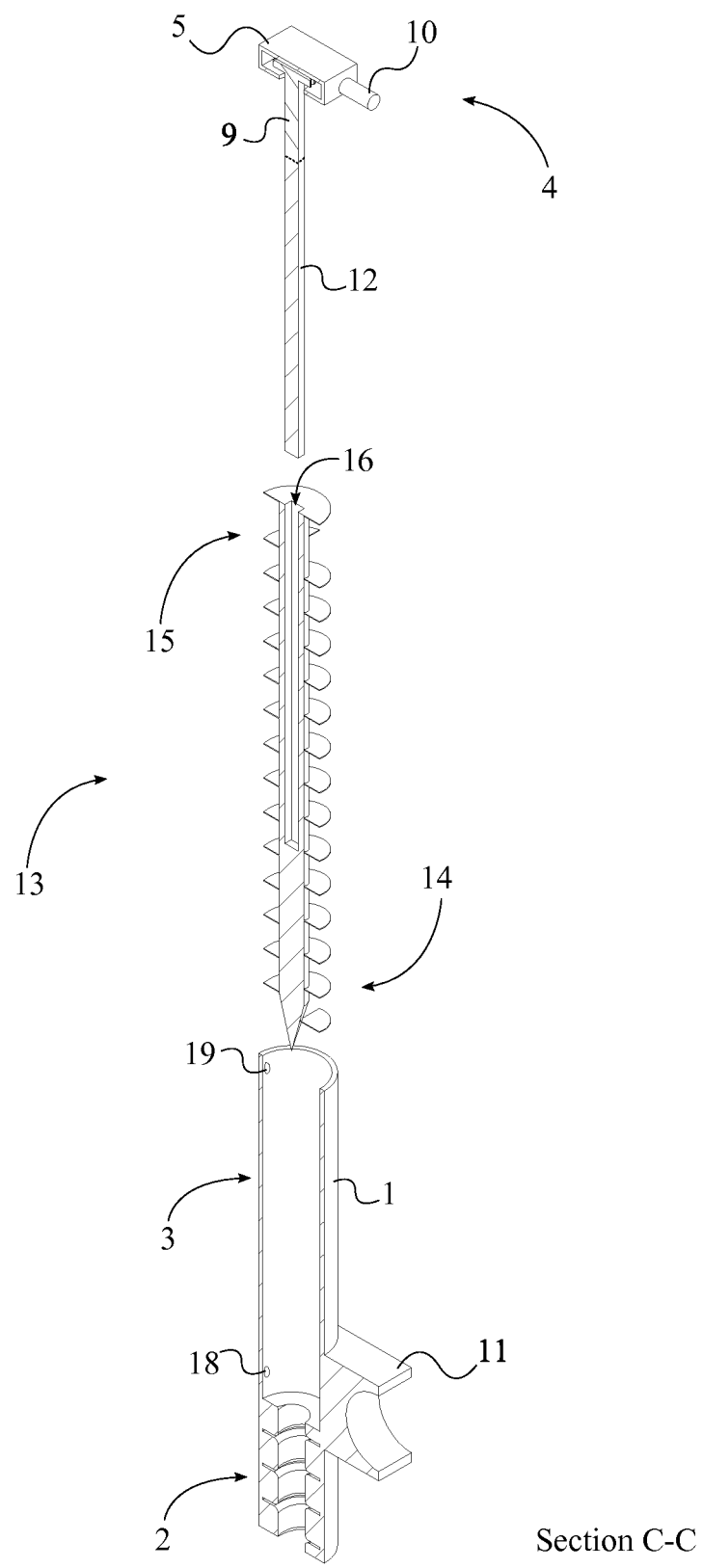
FIG. 3 is a cross-sectional perspective view of the present invention taken along line C-C of FIG. 2.

As can be seen in FIG. 1-FIG. 3, the present invention comprises a tubular body 1, a driving mechanism 4, a mounting mechanism 11, a medium shaft 12, a screwpile 13, and a control unit 17. The tubular body 1 houses and provides physical protection to the internal workings of the present invention, facilitates the vertical translation of the screwpile 13, and acts as part of the anchoring medium by connecting the screwpile 13 to the irrigation unit. The driving mechanism 4 provides the rotational motion necessary for the function of the present invention. The mounting mechanism 11 attaches or connects the tubular body 1 and the associated components of the present invention to the base of the irrigation tower. The screwpile 13 physically attaches/anchors the present invention to the ground and prevents translation of any kind, thus ensuring stability for the irrigation unit in extreme weather conditions. The medium shaft 12 couples the driving mechanism 4 to the screwpile 13 to transfer the rotational motion produced by the driving mechanism 4. The control unit 17 takes input from the user, the system, and produces instructions for the present invention, in particular the driving mechanism 4.

The tubular body 1 serves two main functions, to house the screwpile 13 and to facilitate vertical translation and axial rotation of the screwpile 13. The tubular body 1 comprises a helical female threaded portion 2 and a lumen portion 3. The lumen portion 3 and the helical female threaded portion 2 are positioned opposite to each other along the tubular body 1 as seen in FIG. 3. The screwpile 13 is sleeved by the tubular body 1 as seen in FIG. 1. More specifically, the screwpile 13 traverses through the lumen portion 3 and is engaged to the helical female threaded portion 2. The lumen portion 3 houses and protects the screwpile 13. The helical female threaded portion 2 provides a track for the screwpile 13 to convert rotation motion into vertical translation similar to a screw configuration. In the preferred embodiment, the lumen portion 3 makes up the majority of the tubular body 1 as seen in FIG. 3. A longer lumen portion 3 allows for a greater vertical range of translation for the screwpile 13 which in turn allows the screwpile 13 to protrude further out of the tubular body 1 and protrude deeper into the ground. The tubular body 1 is attached to the irrigation unit via the mounting mechanism 11 and as such the mounting mechanism 11 is laterally connected to the tubular body 1. The vertical location of the mounting mechanism 11 also aids in determining the depth of ground penetration of the screwpile 13 and in turn the anchoring strength achieved. Alternative means for attaching and or mounting the present invention to the irrigation unit(s) may also be utilized instead or in addition to the described method. The length, width, depth, and sizing of the present invention may be increased or decreased to accommodate the needs and weights of different types of mobile irrigation systems, or vehicles in alternative applications.

The driving mechanism 4 is operatively coupled and axially connected to the medium shaft 12, wherein the driving mechanism 4 rotates the medium shaft 12. The control unit 17 is communicably coupled to the driving mechanism 4 and provides operational instructions to the driving mechanism 4. The communicably coupling between the control unit 17 and the driving mechanism 4 can be either a wireless or wired connection. The medium shaft 12 is telescopically connected and rotationally fixed to the screwpile 13. The connection between the medium shaft 12 and the screwpile 13 allows for the medium shaft 12 to rotate the screwpile 13 while simultaneously allowing the screwpile 13 to move along the length of the axis of rotation. Various additional devices may be communicably coupled to the control unit 17 including, but not limited to, portable computing devices, laptops, tablets, desktop computers, remote controllers, and other similar devices; this gives the user direct control over the present invention through a plurality of different means. In the preferred embodiment, the user would be able to download a software application onto their computer, smart phone, or similar device and control the present invention from said device. Additionally, a variety of devices may be used in conjunction with the present invention to predict and measure weather conditions, such as an anemometer and/or a rain sensor. Furthermore, the control unit 17 may be linked directly or indirectly to the internet, through a wired or wireless connection to a modem or wireless module, to gather weather predictions and conditions such that appropriate actions are executed in a timely manner. An internet connection will also allow for remote control of the present invention from any internet capable device, increasing the usability of the present invention.

The device could also be outfitted with an audible safety beacon, this beacon would emit a loud audible alarm whenever the screw pile is in motion to alert anybody nearby to stay clear. The present invention may also be interlocked with the pivot drive mechanism so the pivot drive could not be engaged while the screw pile is extended and would likewise not allow the screw pile to be extended while the pivot tower driving mechanism is active.

Figure 4:
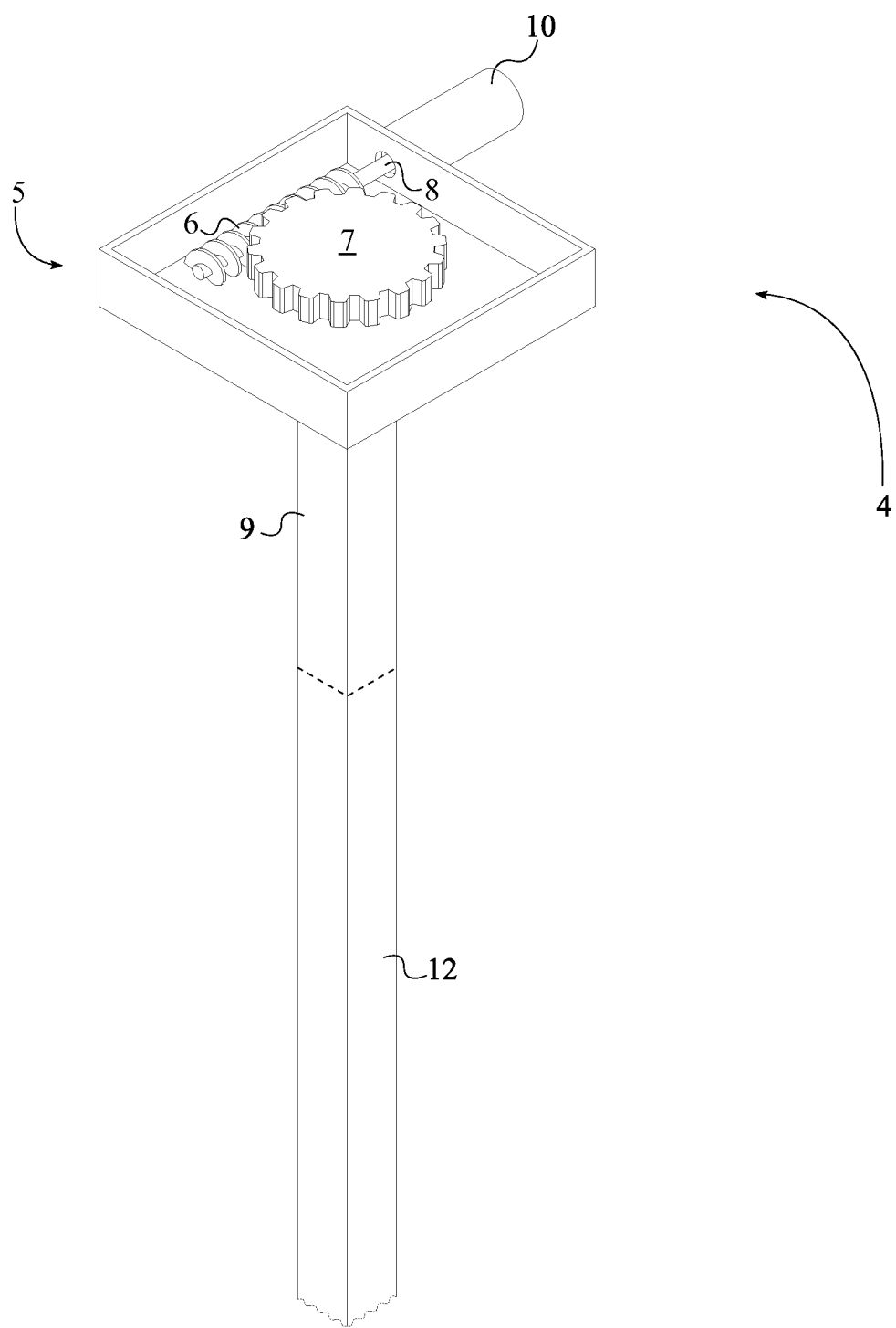
FIG. 4 is a cross-sectional perspective view of the present invention taken along line D-D of FIG. 2.

The driving mechanism 4 comprises a gearbox 5 and a motor 10. The gearbox 5 comprises an input shaft 8 and an output shaft 9. The gearbox 5 reduces the angular speed and increases the torque of the rotational motion as the rotational motion is transferred from the motor 10 to the output shaft 9. The motor 10 is axially connected into the input shaft 8 such that power may flow into the gearbox 5 and as such the motor 10 is positioned adjacent to the gearbox 5. In the preferred embodiment, the motor 10 is electric and is powered by either a battery or an external power source such as the power source of the irrigation unit. Additionally, the motor 10 may be hydraulic based instead. The output shaft 9 is axially connected to the medium shaft 12 as seen in FIG. 4. To avoid additional drive train components, the gearbox 5 is adjacently connected to the tubular body 1, opposite the helical female threaded portion 2 as seen in FIG. 1. The input shaft 8 is mechanically coupled to the output shaft 9, preferably through a worm drive type of gearing; alternative gearing configurations may also be utilized.

In the preferred embodiment, the gearbox 5 further comprises a worm gear 6 and a worm wheel 7. The input shaft 8 is axially connected to the worm gear 6, which allows the worm gear 6 to torsionally receive the rotational motion from the input shaft 8. The worm gear 6 is tangentially engaged to the worm wheel 7 in order to perpendicularly change the direction of rotational motion from the worm wheel 7. Finally, the worm wheel 7 is axially connected to the output shaft 9 so that the output shaft 9 is able to torsionally receive the rotational motion from the worm wheel 7. This worm drive gear train ensures a low speed, high torque output; the ideal combination for driving the screwpile 13 into the ground. In addition, because of the increased friction between the two gears the direction of transmission is not reversible; this prevents the screwpile 13 from rotating by itself and as a result damaging the internal workings of the present invention. In alternative embodiment, different mechanisms and configurations may be utilized to achieve the functions of the gearbox. Rotational motion may be transferred and manipulated through the use of a combination of belts, pulleys, sprockets, chains, spur gears, bevel gears, and or other similar mechanisms.

The screwpile 13 further comprises a pile toe portion 14, a capped portion 15, and a shaft-receiving cavity 16. The pile toe portion 14 and the capped portion 15 are positioned opposite to each other along the screwpile 13. In the preferred embodiment, the pile toe portion 14 is a pointed end, as seen in FIG. 2, which aids the screwpile 13 in penetrating the ground. The capped portion 15 contains a disk at the end and physically prevents the screwpile 13 from falling out of the tubular body 1 and as such is located within the lumen portion 3. The shaft-receiving cavity 16 traverses into the capped portion 15 as can be seen in FIG. 3. The medium shaft 12 is slidably sleeved within the shaft-receiving cavity 16. The cross-section of the shaft-receiving cavity 16 and the medium shaft 12 must be the same in order to allow the screwpile 13 to slide up and down on the medium shaft 12. In the preferred embodiment, the cross-section of the medium shaft 12 and the cross-section of the shaft-receiving cavity 16 is a square shape. The square cross-sectional shape prevents the screwpile 13 from rotating about the medium shaft 12; alternative noncircular shapes may also be utilized as well such as hexagonal, triangular, and any other asymmetrical or symmetrical shape.

Figure 5:
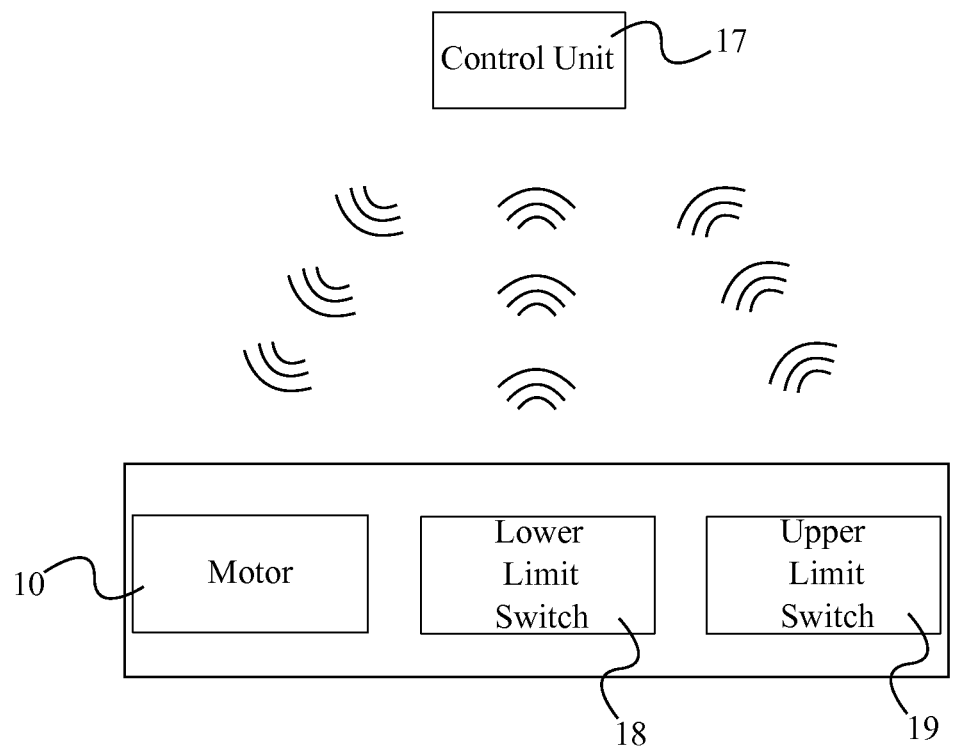
FIG. 5 is a schematic diagram of the present invention depicting the flow of data between the various components.

An at least one upper limit switch 19 and an at least one lower limit switch 18 is utilized to prevent the screwpile 13 from extending past the limits of the tubular body 1 and potentially damaging the components of the present invention. The limit switches could also be coupled with additional emergency limit switches should a malfunction occur and the switches fail to stop the rotation of the screwpile. The at least one lower limit switch 18 and the at least one upper limit switch 19 are communicably coupled to the control unit 17 as seen in FIG. 5. The at least one lower limit switch 18 is mounted within the lumen portion 3, adjacent to the helical female threaded portion 2. The at least one upper limit switch 19 is mounted opposite the at least one lower limit switch 18 within the lumen portion 3 as seen in FIG. 3. The limit switches are configured to signal the control unit 17 as the capped portion 15 passes either switch; the signal initiates a stop procedure for the present invention. In the preferred embodiment, there are two lower limit switches and two upper limit switches. Additionally, the stop procedures could also lockout the anchoring device and set an alarm code to the controller.

FIG. 6 and FIG. 7 illustrate the present invention being mounted onto the base of a single irrigation tower. In the retracted state, the majority of the screwpile 13 is positioned within the tubular body 1 as seen in FIG. 6. During regular operation of the irrigation system, the present invention is in the retracted state. In the extended state, the screwpile 13 is extended out of the bottom of the tubular body 1 and dug into the ground underneath and thus anchoring the whole unit, as seen in FIG. 7.

In one embodiment, a rail system is used to translate the screwpile 13 along the vertical axis to engage and disengage the ground. Two plates are utilized for this configuration; the first plate is mounted to the irrigation unit; the second plate houses the screwpile 13 and the driving mechanism 4. The second plate is slidably engaged to the first plate, allowing for the second plate to translate relative to the first plate. This configuration allows the screwpile 13 and the driving mechanism 4 to translate up and down on the rails while simultaneously rotating the screwpile 13. A rack and pinion gear linear actuator can be used to move the screwpile 13 and the driving mechanism 4 up and down the rails; the pinion gear is attached to the second plate and powered by the driving mechanism 4 while the rack is integrated into the first plate complimentary to the position of the pinion gear. The first plate is slidably attached to the second plate with the pinion gear being torsionally engaged to the rack. In the extended state, the second plate and the associated components is located below the first plate with the screwpile penetrating the ground below. In the contracted state, the second plate is located coincidental with the first plate which allows the irrigation unit to move unrestricted.

Although the invention has been explained in relation to its preferred embodiment, it is to be understood that many other possible modifications and variations can be made without departing from the spirit and scope of the invention as hereinafter claimed, for example the vertical motion of the screwpile could be achieved using a rack and pinion drive.

What is claimed is:

1. An automatic anchor for a self-propelled irrigation system comprises:
    a tubular body;
    a driving mechanism;
    a mounting mechanism;
    a medium shaft;
    a screwpile;
    a control unit;
    the tubular body comprises an helical female threaded portion and a lumen portion;
    the mounting mechanism being laterally connected to the tubular body;
    the control unit being communicably coupled to the driving mechanism;
    the driving mechanism being operatively coupled and axially connected to the medium shaft, wherein the driving mechanism is used to rotate the medium shaft;
    the medium shaft being telescopically connected and rotationally fixed to the screwpile;
    the screwpile being sleeved by the tubular body;
    the lumen portion and the helical female threaded portion being positioned opposite to each other along the tubular body;
    the screwpile traversing through the lumen portion and being engaged to the helical female threaded portion.

2. The automatic anchor for a self-propelled irrigation system as claimed in claim 1 comprises:
    the driving mechanism comprises a gearbox and a motor;
    the gearbox comprises an input shaft and an output shaft;
    the motor being axially connected into the input shaft;
    the input shaft being mechanically coupled to the output shaft;
    the output shaft being axially connected to the medium shaft.

3. The automatic anchor for a self-propelled irrigation system as claimed in claim 2 comprises:
    the motor being positioned adjacent to the gearbox;
    the gearbox being adjacently connected to the tubular body, opposite the helical female threaded portion.

4. The automatic anchor for a self-propelled irrigation system as claimed in claim 2 comprises:
    the gearbox further comprises a worm gear and a worm wheel;
    the input shaft being axially connected to the worm gear;
    the worm gear being tangentially engaged to the worm wheel;
    the worm wheel being axially connected to the output shaft.

5. The automatic anchor for a self-propelled irrigation system as claimed in claim 1 comprises:
    the screwpile further comprises a pile toe portion, a capped portion, and a shaft-receiving cavity;
    the pile toe portion and the capped portion being positioned opposite to each other along the screwpile;
    the shaft-receiving cavity traversing into the capped portion;
    the capped portion being located within the lumen portion;
    the medium shaft being slidably sleeved within the shaft-receiving cavity.

6. The automatic anchor for a self-propelled irrigation system as claimed in claim 5 comprises:
    a cross-section of the medium shaft and a cross-section of the shaft-receiving cavity being a square shape.

7. The automatic anchor for a self-propelled irrigation system as claimed in claim 1 comprises:
    an at least one lower limit switch;
    an at least one upper limit switch;
    the at least one lower limit switch and the at least one upper limit switch being communicably coupled to the control unit;
    the at least one lower limit switch being mounted within the lumen portion, adjacent to the helical female threaded portion;
    the at least one upper limit switch being mounted opposite the at least one lower limit switch within the lumen portion.

8. The automatic anchor for a self-propelled irrigation system as claimed in claim 1 comprises:
    a cross-section of the medium shaft and a cross-section of the shaft-receiving cavity being a square shape.

9. An automatic anchor for a self-propelled irrigation system comprises:
    a tubular body;
    a driving mechanism;
    a mounting mechanism;
    a medium shaft;
    a screwpile;
    a control unit;
    the tubular body comprises an helical female threaded portion and a lumen portion;
    the mounting mechanism being laterally connected to the tubular body;

the control unit being communicably coupled to the driving mechanism;

the driving mechanism being operatively coupled and axially connected to the medium shaft, wherein the driving mechanism is used to rotate the medium shaft;

the medium shaft being telescopically connected and rotationally fixed to the screwpile;

the screwpile being sleeved by the tubular body;

the lumen portion and the helical female threaded portion being positioned opposite to each other along the tubular body;

the screwpile traversing through the lumen portion and being engaged to the helical female threaded portion;

the screwpile further comprises a pile toe portion, a capped portion, and a shaft-receiving cavity;

the pile toe portion and the capped portion being positioned opposite to each other along the screwpile;

the shaft-receiving cavity traversing into the capped portion;

the capped portion being located within the lumen portion;

the medium shaft being slidably sleeved within the shaft-receiving cavity.

10. The automatic anchor for a self-propelled irrigation system as claimed in claim 9 comprises:

the driving mechanism comprises a gearbox and a motor;

the gearbox comprises an input shaft and an output shaft;

the motor being axially connected into the input shaft;

the input shaft being mechanically coupled to the output shaft;

the output shaft being axially connected to the medium shaft.

11. The automatic anchor for a self-propelled irrigation system as claimed in claim 10 comprises:

the motor being positioned adjacent to the gearbox;

the gearbox being adjacently connected to the tubular body, opposite the helical female threaded portion.

12. The automatic anchor for a self-propelled irrigation system as claimed in claim 10 comprises:

the gearbox further comprises a worm gear and a worm wheel;

the input shaft being axially connected to the worm gear;

the worm gear being tangentially engaged to the worm wheel;

the worm wheel being axially connected to the output shaft.

13. The automatic anchor for a self-propelled irrigation system as claimed in claim 9 comprises:

an at least one lower limit switch;

an at least one upper limit switch;

the at least one lower limit switch and the at least one upper limit switch being communicably coupled to the control unit;

the at least one lower limit switch being mounted within the lumen portion, adjacent to the helical female threaded portion;

the at least one upper limit switch being mounted opposite the at least one lower limit switch within the lumen portion.

14. The automatic anchor for a self-propelled irrigation system as claimed in claim 9 comprises:

an at least one lower limit switch;

an at least one upper limit switch;

the at least one lower limit switch and the at least one upper limit switch being communicably coupled to the control unit;

the at least one lower limit switch being mounted within the lumen portion, adjacent to the helical female threaded portion;

the at least one upper limit switch being mounted opposite the at least one lower limit switch within the lumen portion.

15. An automatic anchor for a self-propelled irrigation system comprises:

a tubular body;

a driving mechanism;

a mounting mechanism;

a medium shaft;

a screwpile;

a control unit;

the tubular body comprises an helical female threaded portion and a lumen portion;

the mounting mechanism being laterally connected to the tubular body;

the control unit being communicably coupled to the driving mechanism;

the driving mechanism being operatively coupled and axially connected to the medium shaft, wherein the driving mechanism is used to rotate the medium shaft;

the medium shaft being telescopically connected and rotationally fixed to the screwpile;

the screwpile being sleeved by the tubular body;

the lumen portion and the helical female threaded portion being positioned opposite to each other along the tubular body;

the screwpile traversing through the lumen portion and being engaged to the helical female threaded portion;

the screwpile further comprises a pile toe portion, a capped portion, and a shaft-receiving cavity;

the pile toe portion and the capped portion being positioned opposite to each other along the screwpile;

the shaft-receiving cavity traversing into the capped portion;

the capped portion being located within the lumen portion;

the medium shaft being slidably sleeved within the shaft-receiving cavity;

the driving mechanism comprises a gearbox and a motor;

the gearbox comprises an input shaft and an output shaft;

the motor being axially connected into the input shaft;

the input shaft being mechanically coupled to the output shaft;

the output shaft being axially connected to the medium shaft.

16. The automatic anchor for a self-propelled irrigation system as claimed in claim 15 comprises:

the motor being positioned adjacent to the gearbox;

the gearbox being adjacently connected to the tubular body, opposite the helical female threaded portion.

17. The automatic anchor for a self-propelled irrigation system as claimed in claim 15 comprises:

the gearbox further comprises a worm gear and a worm wheel;

the input shaft being axially connected to the worm gear;

the worm gear being tangentially engaged to the worm wheel;

the worm wheel being axially connected to the output shaft.

18. The automatic anchor for a self-propelled irrigation system as claimed in claim 15 comprises:

a cross-section of the medium shaft and a cross-section of the shaft-receiving cavity being a square shape.

* * * * *